(12) United States Patent
Andrzejewski et al.

(10) Patent No.: US 10,577,952 B2
(45) Date of Patent: Mar. 3, 2020

(54) PROPELLER BLADES

(71) Applicant: Ratier-Figeac SAS, Figeac (FR)

(72) Inventors: Arnaud Andrzejewski, Lissac et Mouret (FR); Catherine Delmas, Capdenac Gare (FR); Bruno Seminel, Lissac et Mouret (FR)

(73) Assignee: RATIER-FIGEAC SAS, Figeac (FR)

( * ) Notice: Subject to any disclaimer, the term of this patent is extended or adjusted under 35 U.S.C. 154(b) by 285 days.

(21) Appl. No.: 15/498,673

(22) Filed: Apr. 27, 2017

(65) Prior Publication Data
US 2017/0314403 A1 Nov. 2, 2017

(30) Foreign Application Priority Data

Apr. 27, 2016 (EP) ..................................... 16305487

(51) Int. Cl.
*B64C 11/04* (2006.01)
*F01D 5/32* (2006.01)
*F01D 5/02* (2006.01)
*F01D 5/12* (2006.01)

(52) U.S. Cl.
CPC ................. *F01D 5/32* (2013.01); *B64C 11/04* (2013.01); *F01D 5/02* (2013.01); *F01D 5/12* (2013.01); *F05D 2230/60* (2013.01); *F05D 2300/121* (2013.01); *F05D 2300/43* (2013.01)

(58) Field of Classification Search
CPC ......... B64C 11/04; B64C 11/05; B64C 11/26; B64C 11/30
See application file for complete search history.

(56) References Cited

U.S. PATENT DOCUMENTS

| | | | | | |
|---|---|---|---|---|---|
| 2,638,295 | A | * | 5/1953 | Sheets | B64D 15/14 244/134 D |
| 4,507,091 | A | * | 3/1985 | Govan | B63H 5/165 416/146 R |
| 5,020,741 | A | * | 6/1991 | Ziegler | B64D 15/12 174/110 V |
| 5,174,717 | A | * | 12/1992 | Moore | B64D 15/12 244/134 D |

(Continued)

OTHER PUBLICATIONS

Elastic Properties and Young Modulus, Jan. 23, 2010, Engineering Tool Box (Year: 2010).*

(Continued)

*Primary Examiner* — Nathaniel E Wiehe
*Assistant Examiner* — Andrew J Marien
(74) *Attorney, Agent, or Firm* — Cantor Colburn LLP

(57) ABSTRACT

A propeller blade assembly comprises a propeller blade having a blade root for attaching the propeller blade to a hub. The blade root has a radially outer surface. The assembly further comprises a collar mounted to the blade root. The collar comprises at least two collar segments assembled around the radially outer surface of the blade root. Each collar segment has a radially inner surface, an opposed radially outward surface and first and second circumferential end lugs. The lugs receive fasteners for coupling the collar segments together to form the collar. The collar segments are formed from a flexible plastics material and the radially inner surface of each collar segments engages the radially outer surface of the blade root only over a limited circumferential extent of the collar segment.

20 Claims, 4 Drawing Sheets

(56) References Cited

U.S. PATENT DOCUMENTS

| | | | | |
|---|---|---|---|---|
| 6,358,006 B1* | 3/2002 | Weyandt | ............... | B64C 11/00 |
| | | | | 416/39 |
| 6,490,229 B1* | 12/2002 | Caver | ............... | G10K 11/006 |
| | | | | 367/173 |
| 2002/0008177 A1* | 1/2002 | Violette | ............... | B64C 11/04 |
| | | | | 244/123.1 |
| 2003/0156944 A1* | 8/2003 | Rust | ............... | B64C 11/26 |
| | | | | 416/204 R |
| 2010/0253083 A1* | 10/2010 | Schlabach | ............... | F03B 13/00 |
| | | | | 290/54 |
| 2014/0314577 A1* | 10/2014 | Udall | ............... | B64C 11/26 |
| | | | | 416/220 R |
| 2017/0334577 A1* | 11/2017 | Andrzejewski | ....... | B64C 11/205 |

OTHER PUBLICATIONS

European Search Report for Application No. 16305487.7-1757 dated Oct. 17, 2016, 7 Pages.

\* cited by examiner

PROPELLER BLADES

FOREIGN PRIORITY

This application claims priority to European Patent Application No. 16305487.7 filed Apr. 27, 2016, the entire contents of which is incorporated herein by reference.

TECHNICAL FIELD

The present disclosure relates to propeller blades and in particular to a collar for a propeller blade.

BACKGROUND

Propeller blades are typically mounted to a propeller hub by means of a blade root. The blade root may also mount accessories associated with the blade. Examples of such accessories may include electrical connectors, sensors targets, balancing weights, etc. Such accessories are typically mounted to a collar which is mounted to the blade root. The collar may also act as a stop preventing the blade from dropping too far into the hub when the propeller is stationary.

In existing designs, this collar is typically a two-piece collar made from metal such as Aluminium. The collar parts are clamped around the blade root using suitable fasteners. This is a satisfactory system, but there remains a desire in aircraft component design to provide alternative lightweight systems.

SUMMARY

From a first aspect this disclosure provides a propeller blade assembly comprising a propeller blade and a collar. The propeller blade has a blade root for attaching the propeller blade to a hub, the blade root having a radially outer surface. The collar is mounted to the blade root and comprises at least two collar segments assembled around the radially outer surface of the blade root. Each collar segment has a radially inner surface, an opposed radially outward surface and first and second circumferential end lugs. The lugs receiving fasteners for coupling the collar segments together to form the collar. At least one of the collar segments is formed from a flexible material having a lower tensile modulus than that of the blade root and a geometry permitting the collar segment to flex.

The radially inner surface of that collar segment engages the radially outer surface of the blade root only over a limited circumferential extent of the collar segment to permit flexure of the collar segment. The limited circumferential extent may be less than 60%, for example less than 50%, for example 6% to 40% of its circumferential extent in some embodiments.

The radially inner surfaces of the collar segments may each comprise at least one radially inwardly extending region for engaging the radially outer surface of the blade root.

The collar may be mounted in a circumferentially extending groove provided on the radially outer surface of the blade root.

The disclosure also extends to a propeller blade collar comprising at least two collar segments for assembly around the radially outer surface of a propeller blade root. Each collar segment comprises a radially inner surface, an opposed radially outward surface and first and second circumferential end lugs. The end lugs receive fasteners for coupling the collar segments together to form the collar.

At least one of the collar segments is formed from a flexible material and the radially inner surface of the collar segment comprises at least one radially inwardly extending inwardly extending region for engaging the radially outer surface of the blade root over only a limited circumferential extent of the collar segment to permit flexure of the collar segment. The limited circumferential extent may be less than 60%, for example less than 50%, for example 6% to 40% of its circumferential extent in some embodiments.

The collar may comprise just two collar segments, each collar segment being formed from a flexible material. In alternative embodiments, however, one segment may be of a flexible material and the other segment of a rigid material.

Each of the collar segments may comprise at least one radially inwardly extending region.

In one embodiment, one collar segment comprises two inwardly extending regions and the other collar segment comprises just one inwardly extending region.

In such an embodiment, the two inwardly extending regions may be are arranged symmetrically with respect to the one inwardly extending region.

The inwardly extending region may be formed in any suitable manner to provide a variation in the radius of the radially inner surface.

For example the inwardly extending regions may be arcuate regions having a smaller radius than those of adjacent inner surface regions of the collar segments.

The inwardly extending region may join adjacent regions tangentially to avoid stress concentrations.

At least one end lug of at least one of the collar segments may comprise a captive fastener and an adjacent end lug of an adjacent collar segment may comprise an opening for receiving the fastener. Both end lugs of one collar segment may comprise a captive fastener. The captive fastener may be moulded into the end lug. In alternative embodiments, however, non-captive fasteners may be used.

The flexible collar material may have a tensile modulus of below 100 GPa, for example less than 75 GPa. In certain embodiments, it may be a flexible plastics material. Thus in embodiments, one or more collar segments may be formed of any flexible plastics material. Examples include, but are not limited to, a fibre reinforced plastics material, a filled plastics material, polyether ether ketone (PEEK), or polyarylamide (IXEF), or polyamide (PA66). In other embodiments, it may be aluminium.

In embodiments, the collar segments are injection moulded components. In alternative embodiments, the collar segments may be machined components.

Each collar segment may comprise circumferentially extending forward and rear flanges joining the end lugs, and a plurality of strengthening ribs may extend between said flanges. The flanges fit into a groove in the blade root outer surface.

At least one of the collar segments may comprise an indexing formation for engagement with an indexing formation provided on the blade root.

At least one of the collar segments may comprise a mount for an accessory.

The disclosure also extends to assembling a propeller blade assembly as discussed above comprising the steps of assembling the at least two collar segments around the radially outer surface of the blade root with the end lugs of adjacent collar segments opposed to one another, tightening fasteners between the opposed end lugs so as to bring the end lugs into face to face contact with each other and to clamp the collar to the blade root.

BRIEF DESCRIPTION OF DRAWINGS

An embodiment of the disclosure will now be described, by way of example only, with reference to the accompanying drawings in which.

DETAILED DESCRIPTION

Figure 1:
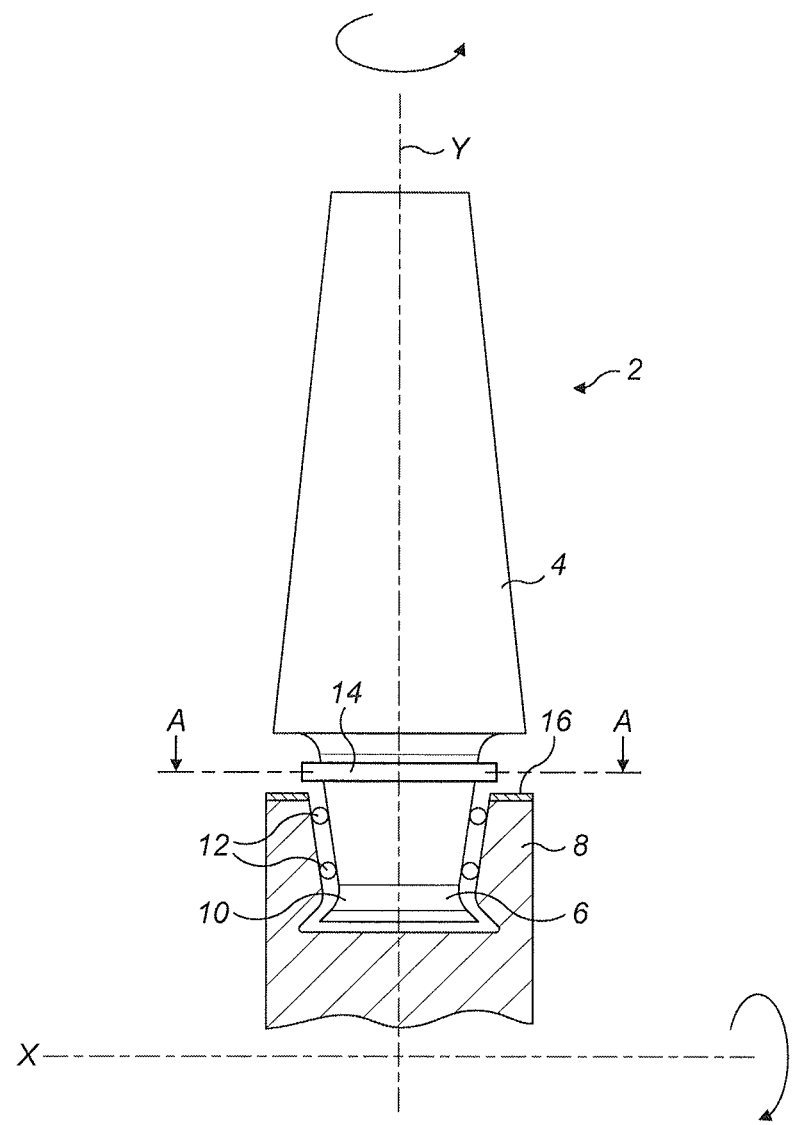
FIG. 1 shows, schematically, a propeller blade assembly in accordance with this disclosure mounted to a hub.
Figure 2:
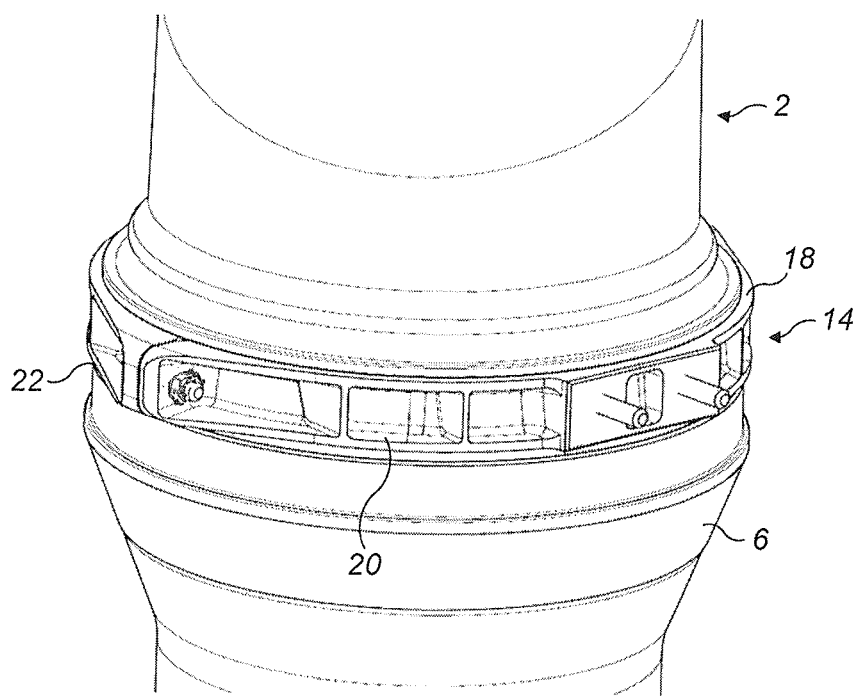
FIG. 2 shows a detail of the propeller blade assembly of FIG. 1.

With reference to FIG. 1, a propeller blade 2 is illustrated having an airfoil section 4 and a blade root 6. The blade root 6 is received in a rotor hub 8 which is driven around a rotor axis X by suitable means, not shown. The blade root 6 mounts the blade 2 to the rotor hub 8 such that the blade 2 is retained in the hub 8 under rotation. The blade root 6 may therefore have, as illustrated, an enlarged inner end 10 received within a corresponding formation 12 on the rotor hub 8. The blade 2 may be mounted for rotation about a blade axis Y, for which purpose bearings 12 may be provided between the blade 2 and the hub 8.

The blade root 6 is formed from a relatively high modulus material such as steel.

Mounted to the upper part of the blade root 6 is a collar 14. The collar 14 may, as discussed further below, act to mount an accessory such as an electrical connector, sensor, target or balancing weight to the blade 2. It may also act as a stop to prevent the blade 2 dropping too far into the hub 8 when the blade is at rest, engaging an opposing shoulder 16 of the hub 8. In the embodiment described, the collar 14 is received in a groove 18 formed in the outer surface of the blade root 6

The collar 14 and its mounting to the blade 2 will now be described in greater detail with reference to FIGS. 2 to 6.

The collar 14 in this embodiment comprises two collar segments, namely a first collar segment 20 and a second collar segment 22. In other embodiments, however, the collar 14 may comprise more than two collar segments.

The flexible material chosen for the collar segments 20, 22 should have a tensile modulus which is lower than that of the blade root 6. In absolute terms, the tensile modulus may be less than 100 GPa, for example less than 75 GPa.

In the illustrated embodiment, both the first and second collar segments 20, 22 are formed from a flexible material, in this embodiment a flexible plastics material. Any flexible plastics material may be used. Examples may include fibre, e.g. glass fibre, reinforced plastics material, a filled plastics material, unfilled plastic materials, PEEK, polyarylamide (IXEF), or polyamide (PA66. The particular material chosen will depend on the operational conditions the blade will exhibit in use.

The collar segments 20, 22 may be formed by any suitable process. Injection moulding may be a particularly advantageous technique for cost and simplicity, but other processes such as machining or an additive manufacturing process may be used.

The first collar segment 20 comprises a generally semi-circular first radially outer surface 24 and first radially inner surface 26. The second collar segment 20 comprises a generally semi-circular second radially outer surface 28 and second radially inner surface 30. The first and second radially inner surfaces 26, 30 when assembled form a generally circular radially inner collar surface which engages a radially outer surface 32 of the groove 18 formed in the blade root 6.

In this embodiment, the radially inner collar surface is generally circular in cross section and is cylindrical in shape. However, it may be non-circular in cross section, for example oval in cross section. It may also be non-cylindrical, for example tapering from one side to the other to form a conical surface.

The first collar segment 20 comprises first and second, radially projecting circumferential end lugs 34, 36. Each of the first and second lugs 34, 36 has a mating face 38. The mating faces 38 are generally co-planar and, after assembly, extend along a diameter D of the collar 14. A bore 40 extends through each of the first and second lugs 34, 36.

The second collar segment 20 comprises third and fourth radially projecting circumferential end lugs 42, 44. Each of the third and fourth lugs 42, 44 has a mating face 46. The mating faces 46 are generally co-planar and, after assembly, extend along the diameter D of the collar 14.

Each of the third and fourth lugs 42, 44 receives a captive fastener 48 for example a treaded fastener such as a bolt or a stud, as illustrated. The fasteners 48 may be insert moulded into the third and fourth lugs 42, 44 during manufacture of the second collar segment 22. As can be seen, the fasteners 48 extend through the bores 40 formed in the first and second lugs 34, 36 and receive respective nuts 50. In other embodiments, the third and fourth lugs 42, 44 may instead be provided with bores and the collar segments 20, 22 be fastened together by non-captive fasteners extending through the bores in the respective first to fourth lugs. The described embodiment may, however, be advantageous in that it retains the fastener 48, avoiding inadvertent separation of the fastener 48, and also facilitating assembly.

The first and second collar segments 20, 22 further each comprise axially spaced flanges 52, 54 which extend radially outwardly from the outer surfaces 24, 28 and circumferentially to join the first and second lugs 34, 36 and third and fourth lugs 42, 44 respectively. The flanges 52, 54 locate the collar 14 within the groove 18. Strengthening ribs 56 are formed extending axially between the flanges 50, 52. In this embodiment the ribs 56 extend generally perpendicularly to the collar D to facilitate manufacture by moulding.

The first collar segment 20 further comprises a mounting boss 58 on its outer surface 24 for mounting an accessory 60, shown schematically. The mounting boss 58 may have a recess 62 to limit material thickness in this region and avoid shrinkage. The mounting boss 58 may, as shown, comprise a pair of captive fasteners 66 extending through mounting bores 68 in the accessory 60 and receiving nuts 70.

Figure 3:
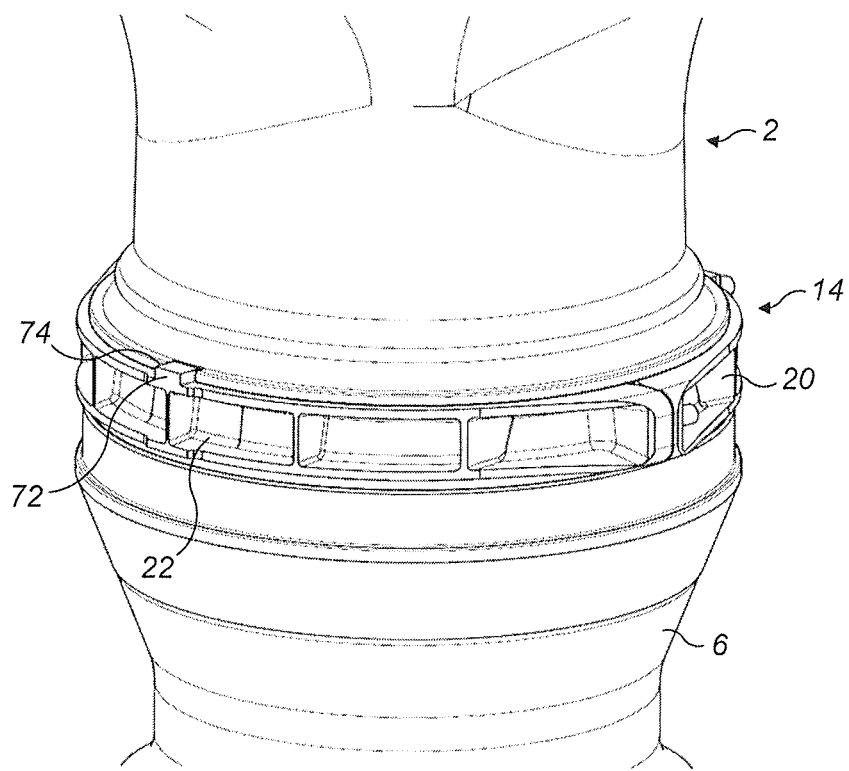
FIG. 3 shows a further detail of the propeller blade assembly of FIG. 1.
Figure 4:
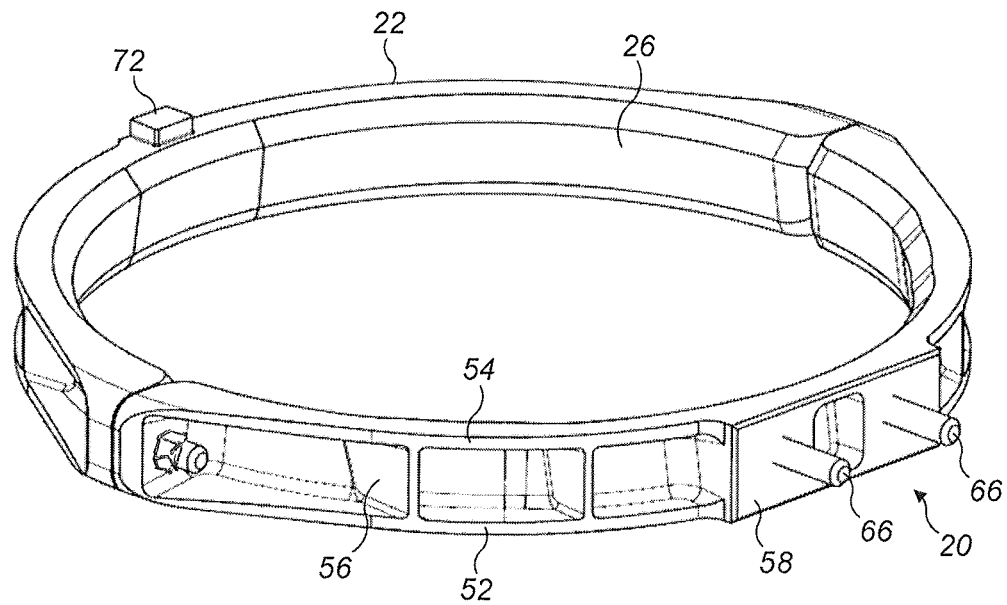
FIG. 4 shows a perspective view of a blade collar in accordance with this disclosure.
Figure 5:
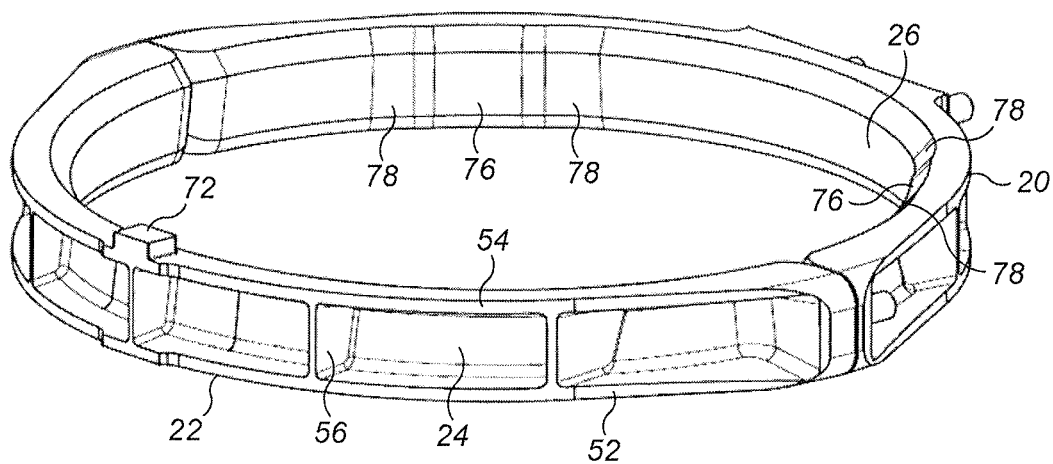
FIG. 5 shows a further perspective view of a blade collar in accordance with this disclosure.
Figure 6:
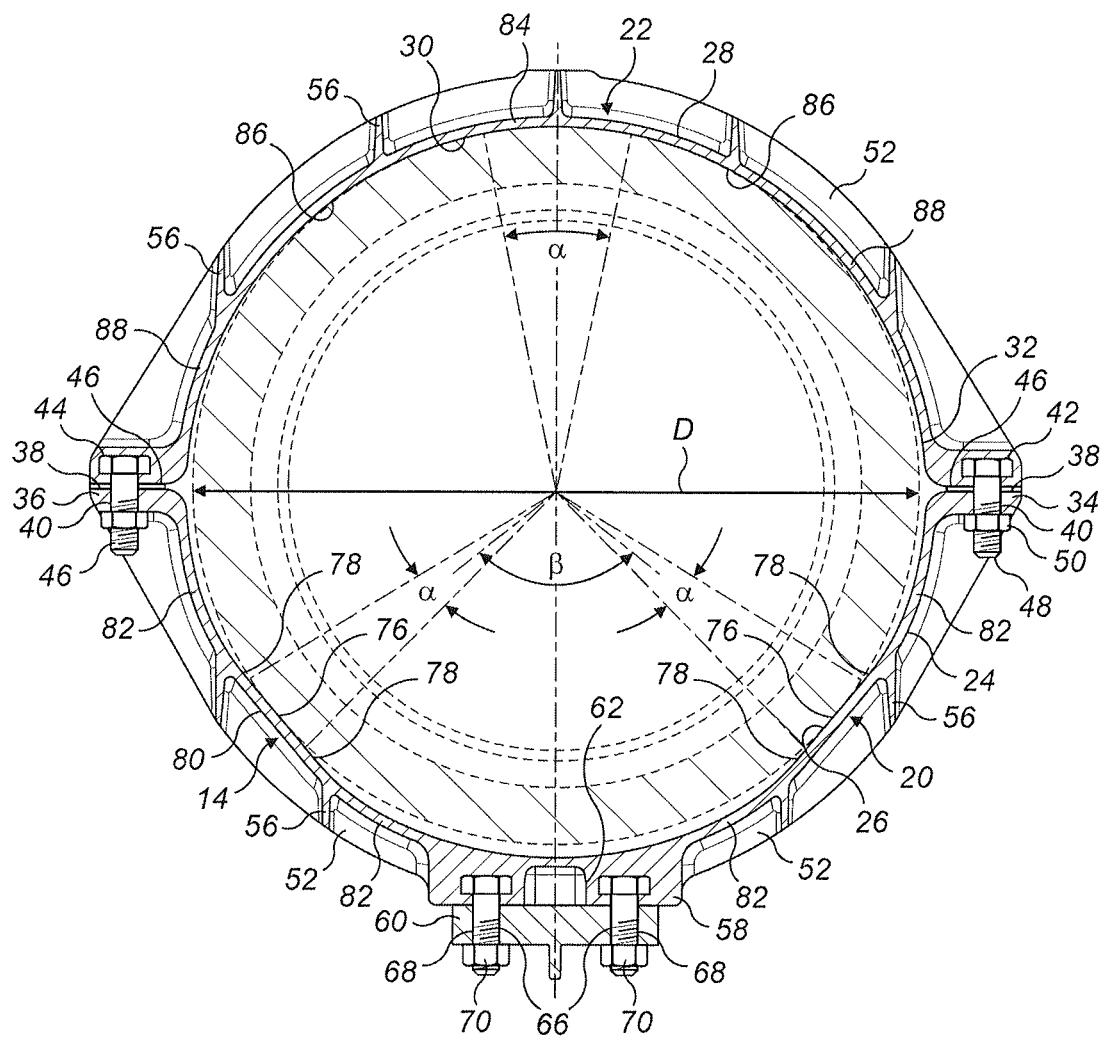
FIG. 6 shows a cross sectional view of the propeller blade assembly of FIG. 1 taken along line A-A.

The second collar segment 22 further comprises an indexing formation or tooth 72 extending from one of the flanges 52, 54 for engagement in a slot 74 formed in an edge of the blade root groove 18 as illustrated in FIG. 3.

The radially inner surface 26 of the first collar segment 20 comprises a pair of radially inwardly extending regions 76. The term "inwardly extending" simply means that the region is radially more inward than adjacent regions. The inwardly extending regions 76 are formed with a smaller radius than the circumferentially adjacent inner surface regions and are smoothly or tangentially connected to those adjacent surface regions by smooth fillets 78 to minimise stress concentrations at the inwardly extending regions 76. The inwardly extending regions 76 form locally thicker regions 80 of the first collar segment 20 separating locally thinner regions 82. In this embodiment, the inwardly extending regions 76 are symmetrically arranged and have an angular extent a of approximately 12° and an angular separation β of approximately 120°. These are merely exemplary figures, however, and are not limiting on the scope of the disclosure.

The radially inner surface 30 of the second collar segment 22 comprises a single radially inwardly extending region 84. The inwardly extending region 84 is formed with a smaller radius than the circumferentially adjacent inner surface regions and is smoothly or tangentially connected to the adjacent surface regions by smooth fillets 86 to minimise stress concentrations at the inwardly extending region 84. The inwardly extending region 84 forms a locally thicker region of the first collar segment 22 separating locally thinner regions 88. In this embodiment, the inwardly extending region 84 is symmetrically arranged about a centreline C of the second collar segment 22 and has an angular extent γ of approximately 24°. Again this is merely an exemplary figure and not limiting on the scope of the disclosure. In this embodiment, the inwardly extending region is generally aligned with the indexing tooth 72.

It will be seen that in this embodiment, the inwardly extending regions 76 of the first collar segment 20 are arranged symmetrically with respect to the inwardly extending region 84 of the second collar segment 22, although this is not essential.

The collar segments 20, 22 are in contact with the outer surface 26 effect of the inwardly extending regions 76, 84 is that the respective collar segments are in contact with the outer surface 32 of the blade root 6 over a limited circumferential extent. In general, the engagement with the blade root 6 may be less than 60%, for example less than 50%, for example between 6% and 40% of the segments' circumferential extent. In the examples above, the engagement corresponds to a circumferential extent of about 13.5% of each segment 20, 22. The circumferential extent of engagement need not be the same for each of the segments 20, 22.

The first and second collar segments 20, 22 are dimensioned such that when loosely assembled around the blade root 6 the opposed first and third lugs 34, 42 and second and fourth lugs 36, 44 will be spaced apart from one another. Moreover, since the segments 20, 22 are provided with the inwardly extending region 76, 84, only the inwardly extending regions 76, 84 will contact the radially outer surface 32 of the blade root groove 18. The locally thinner regions 80, 88 of the collar segments 20, 22 adjacent the inwardly extending region 84 76, 84 will be spaced from the radially outer surface 32 of the blade root groove 18 by a small clearance. Being thinner, however, they are able to flex.

To assemble the collar 14 to the blade root 6, the collar segments 20, 22 are loosely assembled around the blade root 6 in the blade root groove 18, with the captive fasteners 48 extending through the openings 40 in the first collar segment lugs 34, 36. The indexing tooth 72 of the second collar segment is received in the blade root groove slot 74 to position the collar 14 circumferentially within the groove 18.

Nuts 50 are then tightened on the fasteners 48. As the nuts 50 are tightened, the pads 76, 84 on the first and second collar segments 20, 22 engage the outer surface 32 of the blade root groove 18 and the collar segments 20, 22 clamp around the blade root 6 until the mating faces 38, 46 of the collar segments 20, 22 are brought into engagement. The clamping is facilitated by the thinner regions 80, 88 of the collar segments 20, 22 which by virtue of their clearance from the outer surface 32 of the groove and their material are able to flex and accommodate deformation of the collar segments 20, 22. This may avoid possible stress concentrations in the region of the collar lugs as the collar segments 20, 22 are tightened, while at the same time ensuring a good clamping effect on the blade root 6.

The use of a plastics material for the collar 14 in accordance with certain embodiments of this disclosure reduces the weight and cost of the collar compared to the existing metal collar. The provision of a clearance between regions of the collar segments and the blade root accommodates deflection and deformation of the collar during clamping without causing potentially damaging stress concentrations around the fastenings between the collar segments.

The description above is one of a non-limiting embodiment of the disclosure. It will be understood that modifications may be made to the embodiment without departing from the scope of the disclosure.

For example, while the embodiment has been illustrated with three inwardly extending regions 76, 84 formed on the collar segments 20, 22, other numbers may be provided. For example, two or more inwardly extending regions 76, 84 may be formed on each collar segments 20, 22. In another arrangement only one inwardly extending region may be provided on each collar segment 20, 22. The area of contact between each inwardly extending region 76, 84 and the blade root 6 may be the same for each inwardly extending region 76, 84. Also, the inwardly extending regions 76, 84 may be arranged symmetrically around the collar 14.

The inwardly extending regions 76, 84 are shown in this embodiment as arcuate regions of reduced radius. However, other arrangements, such as discrete projections or pads can be envisaged which space adjacent regions of the collar segments 20, 22 from the radially outer surface 32 to permit flexure of the collar segments 20, 22.

In other embodiments, only one of the collar segments 20, 22 may be provided with one or more inwardly extending regions 76, 84. This may provide sufficient flexure.

In other embodiments, one of the collar segments 20, 22 may be rigid, for example of a rigid metal, with the other collar segment 20, 22 being plastics and having at least one inwardly extending region 76, 84. Again the single plastics collar segment may provide sufficient flexure.

In yet further embodiments, one or more of the collar segments 20, 22 may be made of any material which, with the limited circumferential contact of the segments 20, 22 with the outer surface 32 allows flexure of the collar segment or segments 20 during assembly. Aluminium may provide the necessary degree of flexure.

The invention claimed is:
1. A propeller blade assembly comprising:
   a propeller blade, said propeller blade having a blade root for attaching the propeller blade to a hub, said blade root having a radially outer surface having a circumferentially extending groove therein;
   a collar mounted to the blade root, the collar comprising at least two collar segments assembled around the radially outer surface of the blade root; each collar segment having a radially inner surface, an opposed radially outward surface and first and second circum- ferential end lugs, said lugs receiving fasteners for coupling the collar segments together to form the collar;

wherein at least one of said collar segments is formed from a flexible material having a lower tensile modulus than that of the blade root and a geometry permitting the collar segment to flex;

wherein said radially inner surface of said collar segment engages the radially outer surface of the blade root only over a limited circumferential extent of said collar segment to permit said collar segment to flex.

2. The propeller blade assembly as claimed in claim 1 wherein said radially inner surface of said collar segment engages the radially outer surface of the blade root over less than 60% of its circumferential extent.

3. The propeller blade assembly as claimed in claim 1, wherein said radially inner surface of said collar segment comprises at least one radially inwardly extending region for engaging the radially outer surface of the blade root.

4. The propeller blade assembly as claimed claim 1, wherein said collar comprises two collar segments, each collar segment being formed from a flexible material.

5. The propeller blade assembly as claimed in claim 4, wherein each said collar segment comprises at least one radially inwardly extending region.

6. The propeller blade assembly as claimed in claim 4, wherein one collar segment comprises two inwardly extending regions and the other collar segment comprises one inwardly extending region.

7. The propeller blade assembly as claimed in claim 3, wherein the inwardly extending region is a region having a smaller radius than those of adjacent inner surface regions of the collar segments.

8. The propeller blade assembly as claimed in claim 3, wherein the inwardly extending region is smoothly joined to adjacent inner surface regions of the collar segments.

9. The propeller blade assembly as claimed in claim 1, wherein said flexible material has a tensile modulus of below 100 GPa.

10. The propeller blade assembly as claimed claim 1, wherein said flexible material is a plastics material or aluminium.

11. The propeller blade assembly as claimed claim 1, wherein at least one end lug of at least one of said collar segments comprises a captive fastener, and an adjacent end lug of an adjacent collar segment comprises an opening for receiving the fastener.

12. The propeller blade assembly as claimed claim 1, wherein said collar segments are injection moulded components or machined components.

13. The propeller blade assembly as claimed in claim 1, wherein at least one of said collar segments comprises a mount for an accessory.

14. A method for assembling a propeller blade assembly as claimed in claim 1 comprising:

assembling said at least two collar segments in a groove around the radially outer surface of the blade root with said end lugs of adjacent collar segments opposed to one another; and tightening fasteners between said opposed end lugs so as to bring said end lugs into face to face contact with each other and to clamp said collar to said blade root.

15. The propeller blade collar comprising:

at least two collar segments for assembly around the radially outer surface of a propeller blade root;

each collar segment comprising a radially inner surface, an opposed radially outward surface and first and second circumferential end lugs, said end lugs receiving fasteners for coupling the collar segments together to form the collar;

wherein at least one of said collar segments is formed from a flexible material and wherein said radially inner surface of said at least one collar segment comprises at least one radially inwardly extending region for engaging the radially outer surface of the blade root over only a limited circumferential extent of the at least one collar segment.

16. The propeller blade collar as claim 15, wherein said collar comprises two collar segments, each collar segment being formed from a flexible material.

17. The propeller blade collar as claimed in claim 16, wherein each said collar segment comprises at least one radially inwardly extending region.

18. The propeller blade collar as claimed in claim 17, wherein one collar segment comprises two inwardly extending regions and the other collar segment comprises one inwardly extending region.

19. The propeller blade collar as claimed in claim 15, wherein the inwardly extending region is a region having a smaller radius than those of adjacent inner surface regions of the collar segments.

20. The propeller blade collar as claimed in claim 15, wherein the inwardly extending region is smoothly joined to adjacent inner surface regions of the collar segments.

* * * * *